INVENTOR
Josephine Nelson

Dec. 6, 1966   J. NELSON   3,289,927
HOSPITAL THERMOMETER SHAKER

Filed Oct. 21, 1964   3 Sheets-Sheet 2

INVENTOR
Josephine Nelson

Dec. 6, 1966  J. NELSON  3,289,927
HOSPITAL THERMOMETER SHAKER
Filed Oct. 21, 1964  3 Sheets-Sheet 3

INVENTOR
Josephine Nelson

United States Patent Office 3,289,927
Patented Dec. 6, 1966

3,289,927
HOSPITAL THERMOMETER SHAKER
Josephine Nelson, 626 11th St. S., Lethbridge,
Alberta, Canada
Filed Oct. 21, 1964, Ser. No. 405,476
4 Claims. (Cl. 233—26)

This invention relates to a hospital thermometer shaker particularly to a shaker for shaking down the mercury in a multiplicity of hospital thermometers at the same time and with an equal force.

At the present time where it is essential to operate hospitals as efficiently and as economically as possible without sacrificing the thorough care that is expected by patients in the hospitals, and particularly since most present day hospitals are large institutions, the time that is spent on such matters as shaking the mercury down in a hospital thermometer in each individual room or ward can become a serious item in the cost of operating the hospitals.

It is known to mount a plurality of hospital thermometers around a shaft which is then rotated to cause the mercury by centrifugal action to flow towards the bottom of the thermometer. It is also known to spin individual hospital thermometers manually by a cord or other attachment to the upper end of the thermometer.

It is the main object of the present invention to provide a hospital thermometer shaker and dispenser that is economically operated, efficient, simply manufactured, and durable.

Another object is to provide a hospital thermometer shaker that is very light in weight, being preferably made of aluminum.

Another object is to provide a hospital thermometer shaker that is provided with detachable cages or containers for a predetermined number of hospital thermometers, which cages are preferably made of a light metal such as aluminum.

Another object is to provide a hospital thermometer shaker that is provided with a separate dispenser that is preferably made of aluminum, and to which the cages containing the hospital thermometers may be detachably connected for distribution to the various floors or wards in the particular hospital.

Another object is to provide a hospital thermometer shaker that is provided with detachable cages having interior supports such as spiral coils made of aluminum for the hospital thermometers that permits the thermometers to drop easily into the cages without breaking.

Another object is to provide a hospital thermometer shaker that may be loaded with thermometers very quickly and in which the thermometers dry very quickly.

Another object is to provide a hospital thermometer shaker having cages for the thermometers that may be easily stored away for future distribution.

These objects are accomplished by providing a hospital thermometer shaker consisting of a hollow conically shaped member mounted on a vertical axle and which is rotated by said axle. The axle is driven by a suitable electric motor mounted on a base or platform below the conically shaped member. A switch is provided on the base for operating the motor to rotate the axle and conically shaped member at the required speed. Spaced apertures are provided in the conically shaped member for detachably suspending cages or containers. A predetermined number of spirally coiled supports are mounted in each of the cages for supporting the hospital thermometers in a substantially upwardly sloping position, that is, parallel to the surface of the conically shaped member. Rubber bases are provided on the inner side of the base of the cages. Portable dispensers are provided with apertures on their outer surfaces for attaching the cages of hospital thermometers after the mercury is shaken down by the shaker as required.

The invention consists of the novel arrangements construction and combination of parts hereinafter described and shown in the drawings.

Figure 1:
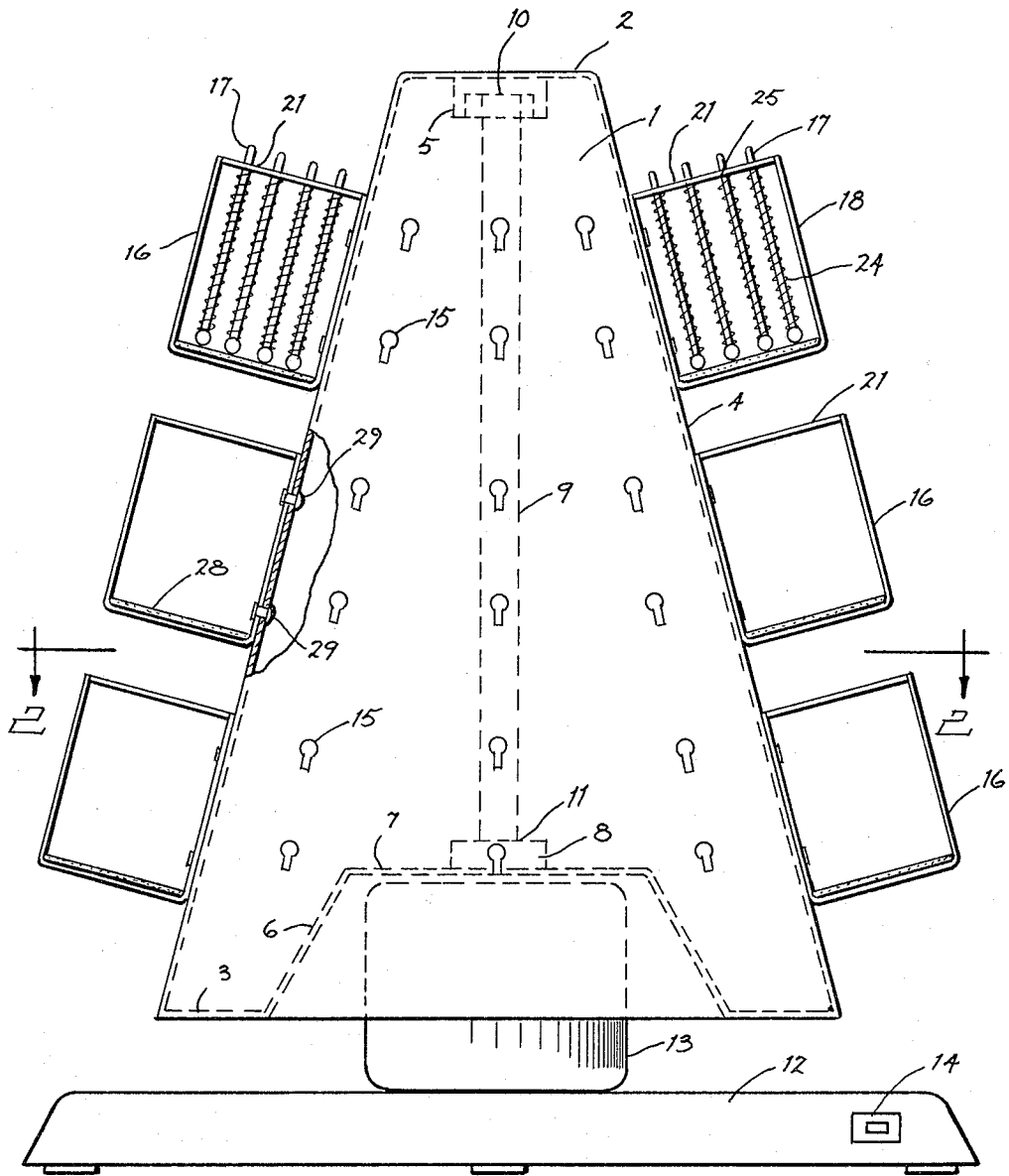
FIGURE 1 is a vertical view of the hospital thermometer shaker.
Figure 2:
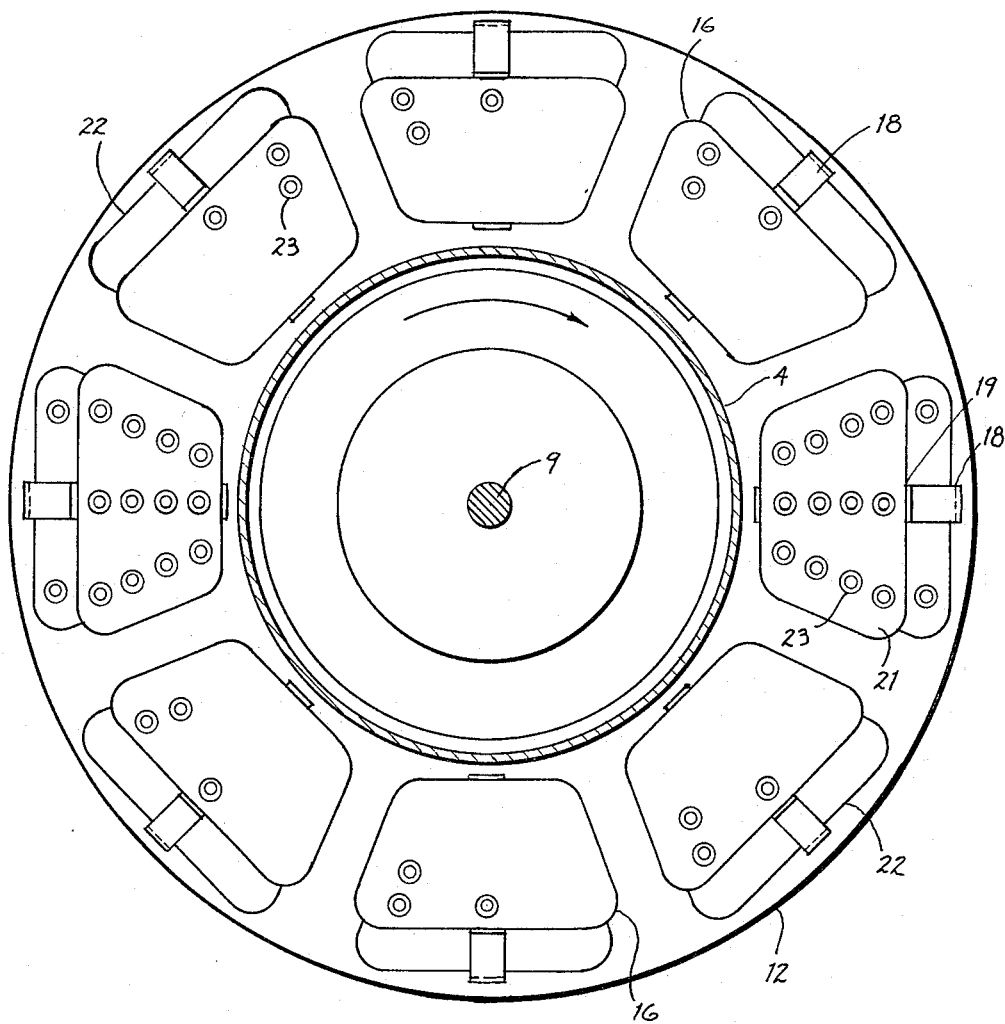
FIGURE 2 is a schematic plan view on the cross-sectional line 2—2 of FIGURE 1.

Referring to the drawings, particularly FIGURES 1 and 2, the hospital thermometer shaker consists of a hollow conically shaped member 1 having the upper side 2 of smaller diameter than the lower side 3 to provide a downwardly and outwardly projecting side 4. The upper side 2 is formed with a centrally placed downwardly projecting part 5 and the lower side 3 is formed with a centrally placed upwardly extending part 6. The inner side 7 of the upwardly extending part 6 is flattened or so shaped to provide a support for a further upwardly extending part 8. A central vertical axle 9 has its upper end 10 mounted in the projecting part 5 and its lower end 11 mounted in the projecting part 8. A circular or other suitably shaped base 12 is mounted at a suitable distance from the lower side 3. An electric motor 13 is mounted centrally of the base 12. The upper part of the electric motor 13 has a driving shaft (not shown) which is connected by conventional gearing to the vertical axle 9 of the hospital thermometer shaker 1. A switch 14 is provided in the base 12 for governing the operation of the electric motor 13 and the rotation of the conically shaped member 1.

As shown in FIGURE 1 the sloping side 4 of the conically shaped member 1 has a predetermined number of apertures 15 for detachably connecting cages 16 for holding hospital thermometers 17 while being rotated with the conically shaped member 1. The cages 16 when mounted on the conically shaped member 1 slope outwardly and downwardly. As shown in FIGURE 1 the cages 15 are evenly spread apart in an upward direction, and as shown in FIGURE 2 the cages 16 are evenly spaced apart horizontally.

Figure 3:
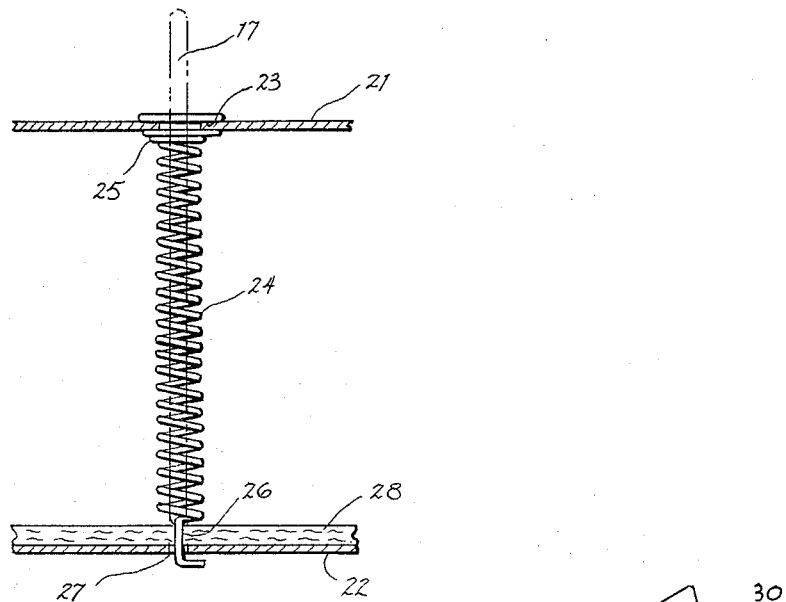
FIGURE 3 is a partial vertical cross-sectional view of one of the cages for holding the hospital thermometers.
Figure 4:
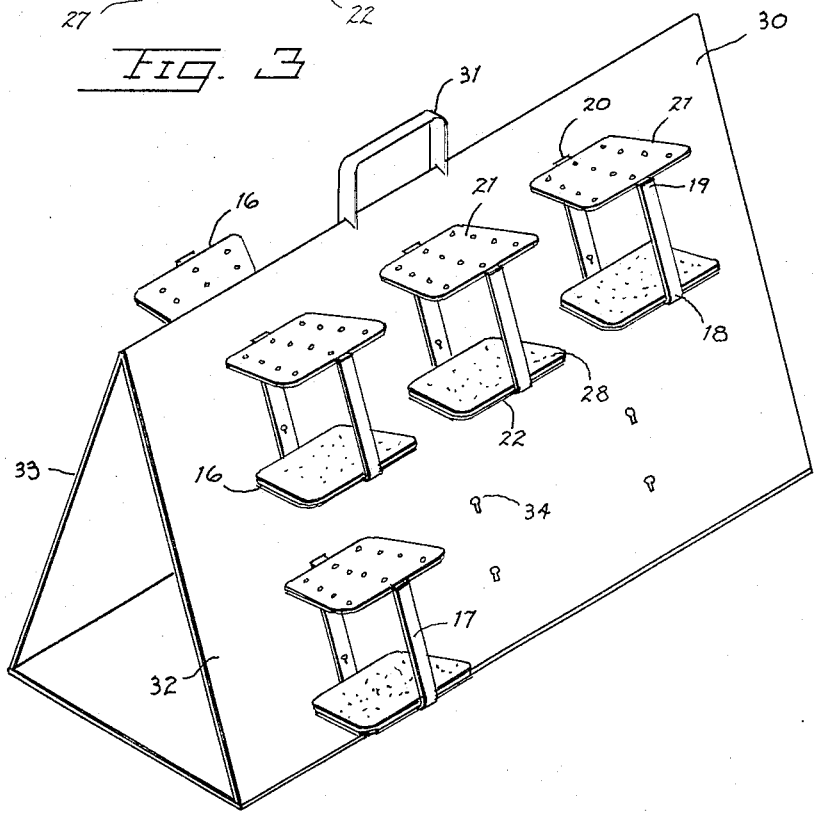
FIGURE 4 is a perspective view of a portable dispenser for the cages containing the hospital thermometers.

The cages 16 consist of a U-shaped metal strap 18 preferably of aluminum, with the upper ends 19 and 20 of the strap 18 welded or otherwise connected to a plate 21 as shown in FIGURES 2 and 4. A similarly shaped metal plate 22 to the plate 21 is mounted on the metal strap 18. Apertures 23 are provided in the plate 21 of the cages 16, and spiral coil holders 24 for the individual hospital thermometers are fastened at their upper ends 25 to the plate 21 around the apertures 23 as shown in FIGURE 3. The lower ends 26 of the spiral coil holders 24 are fastened to the plate 22 by providing apertures 27 through the plate 22 coinciding with the apertures 23 in the plate 21 and then bending the ends of the coil holders 24 under the plate 22. A rubber base 28 is shown mounted on the upper side of the plates of the cages 16 for preventing breakage of the thermometers when they are dropped into the coil holders 24. The tops of the spiral coil holders 24 are formed with a wide mouth at their upper ends 25. Hooks 29 are mounted on the cages 16 as shown in FIGURE 1 for detaching and connecting the cages 16 to the conically shaped member 1.

In FIGURE 4 a dispenser 30 is shown for carrying the cages 16 to and from the hospital thermometer shaker as shown in FIGURES 1, 2 and 3. A proposed shape, triangular in cross section and preferably made of light aluminum metal, is shown with a handle 31. The sides 32 and 33 of the dispenser 30 are provided with similarly spaced apertures 34 as the hospital thermometer shaker for detachably connecting the cages 16 by means of the hooks 29 to the dispenser.

The operation of the hospital thermometer shaker should be readily understood from the above description. At certain times of the day the hospital thermometers would be gathered from each room or wards and placed in the cages and attached to the dispenser 30. After a sufficient number of filled cages has been collected, the dispenser with its attached cages of hospital thermometers would be taken to the hospital thermometer shaker which would have been placed in a convenient place in the particular hospital. The cages of thermometers would then be detached from the dispenser, sterilized and then attached to the conically shaped member 1 of the shaker. After a sufficient number of cages has been attached to the shaker, the motor is started to rotate the conically shaped member 1 and the attached cages 16 of thermometers 17. The centrifugal action on the mercury in the thermometers causes the mercury to flow downwardly in the thermometer. After the shaker has rotated for sufficient time the cages of thermometers are detached from the shaker and attached to the dispenser 30 and are then distributed to the rooms and wards of the particular hospital, or placed in storage until they are required.

From the above description the advantages and the simplicity of the hospital thermometer shaker should be readily apparent without further detail description.

While the invention has been described with particular reference to the specific embodiments it is to be understood it is to be construed broadly and limited only by the scope of the claims.

The embodiments of the invention in which an exclusive property or privilege is claimed are defined as follows:

1. A hospital thermometer shaker comprising a base, a hollow conically shaped member, a vertical axle on which said conically shaped member is mounted for rotation, means mounted on said base below said conically shaped member for rotating said axle, thermometer holding cages detachably connected to the said conically shaped member, and means for mounting supports for the thermometer in said cages.

2. A hospital thermometer shaker as defined in claim 1 in which apertures are provided on either the member or the cages and hooks on the other for detachably connecting the cages to the conically shaped member.

3. A hospital thermometer shaker as defined in claim 1 in which the thermometer holding cages consist of a U-shaped strap with plates connected to the said U-shaped strap at the upper ends of said U-shaped member and at the base of said U-shaped member, apertures formed in the plate at the upper ends of said U-shaped member for supporting the upper ends of said supports for the thermometers, and apertures formed in the plate at the base of the U-shaped member for connecting the lower ends of the supports, said supports being of spiral coil form.

4. A hospital thermometer shaker as claimed in claim 3 in which a rubber base is mounted on top of the plate at the base of the U-shaped member for the thermometers to rest upon.

References Cited by the Applicant

UNITED STATES PATENTS

| 506,838 | 10/1893 | Berg. |
| 1,730,776 | 10/1929 | Lundgren. |
| 2,908,907 | 10/1959 | Danielsson. |
| 3,009,388 | 11/1961 | Polanyi. |
| 3,233,825 | 2/1966 | Lomb. |

M. CARY NELSON, *Primary Examiner.*

H. KLINKSIEK, *Examiner.*